(12) United States Patent
Dingari et al.

(10) Patent No.: US 6,839,745 B1
(45) Date of Patent: Jan. 4, 2005

(54) SYSTEM AND METHOD FOR GENERATING REPORTS IN A TELECOMMUNICATION SYSTEM

(75) Inventors: Hrushikesh Dingari, Tampa, FL (US); Jyotjhi Jagannathan, Wesley Chapel, FL (US); Lakshmi Kuppala, Tampa, FL (US)

(73) Assignee: Verizon Corporate Services Group Inc., New York, NY (US)

( * ) Notice: Subject to any disclaimer, the term of this patent is extended or adjusted under 35 U.S.C. 154(b) by 702 days.

(21) Appl. No.: 09/685,906

(22) Filed: Oct. 10, 2000

Related U.S. Application Data
(60) Provisional application No. 60/219,195, filed on Jul. 19, 2000.

(51) Int. Cl.[7] .............................................. G06F 15/16
(52) U.S. Cl. ......................................... 709/219; 707/10
(58) Field of Search ............................ 707/10; 709/102, 709/106, 201, 219, 229; 715/530, 517; 345/333, 335, 752

(56) References Cited

U.S. PATENT DOCUMENTS

| | | | | |
|---|---|---|---|---|
| 5,745,754 A | * | 4/1998 | Lagarde et al. | 707/104.1 |
| 5,819,271 A | * | 10/1998 | Mahoney et al. | 707/9 |
| 6,154,766 A | * | 11/2000 | Yost et al. | 709/201 |
| 6,279,033 B1 | * | 8/2001 | Selvarajan et al. | 709/217 |
| 6,377,993 B1 | * | 4/2002 | Brandt et al. | 709/227 |
| 6,381,306 B1 | * | 4/2002 | Lawson et al. | 379/32.01 |
| 6,385,644 B1 | * | 5/2002 | Devine et al. | 709/206 |
| 6,615,258 B1 | * | 9/2003 | Barry et al. | 709/223 |

OTHER PUBLICATIONS

Thinque Corporation, (www.thinque.com) sale brochure title: "Merchandising Sale Portfolio", published Aug., 2000.*

* cited by examiner

*Primary Examiner*—Marc D. Thompson
(74) *Attorney, Agent, or Firm*—Leonard C. Suchtye, Esq.; Joel Wall, Esq.; Fitzpatrick, Cella, Harper & Scinto

(57) ABSTRACT

In a computer system having a client/server architecture, a method is provided for generating reports based on information in a telecommunications provisioning and inventorying database (42). The method includes a server (50) presenting a user at a client end (10) with a page (56) offering parameters for formulating a report and scheduling the running and delivery of the report; the user selecting parameters upon which the report is to be formulated and scheduled; and the server (50) interfacing with the database (42) to retrieve information designated by the selected parameters and generating the report in accordance with the selected parameters.

20 Claims, 2 Drawing Sheets

SYSTEM AND METHOD FOR GENERATING REPORTS IN A TELECOMMUNICATION SYSTEM

CROSS-REFERENCE TO RELATED APPLICATION

This application claims benefit of U.S. Provisional Application No. 60/219,195, filed Jul. 19, 2000, which is hereby incorporated by reference.

BACKGROUND OF THE INVENTION

1. Field of the Invention

The present invention relates to apparatuses and methods for generating reports concerning provisioning and inventorying of telecommunication services.

2. Related Art

Companies offering telecommunications services, such as landline telephone, wireless telephone, Internet or other services, typically maintain tremendous databases concerning the provisioning and inventorying of the services that they provide. For landline telephone services, for example, such a database typically includes, for each assigned telephone number, the name of the customer to which the number is assigned, the terminal location to which the services are provided, the features associated with the number (such as, for example, speed dialing, call waiting, caller identification, call forwarding and the like), and other information necessary to effectively administer and manage services provisioning.

Typically, there is a hierarchical structure to the way the telephone numbers in a telecommunication company's database are organized. For example, telephone numbers assigned to geographically proximate locations are typically given the same first three digits and grouped into an exchange; all exchanges serviced by the same switch are grouped into a wire center; and wire centers in the same region (such as, for example, the Southwestern United States) are grouped into catalogues.

Routinely, those administering the provisioning of telecommunication services must access the stored data so that it may be reviewed. Such a task is conventionally accomplished by generating a report which recalls the data and presents it in a format that is readily understandable. For example, an administrator may desire a report which sets forth all of the telephone numbers in a given exchange that have subscribed for a given feature in a given exchange, such as express dialing in the exchange designated by the numbers "978" of area code "813".

Such a report, as might be expected, is generated by specialized software which reviews the data looking for those numbers that fit the specified parameters, and compiles and outputs a resultant listing.

Conventionally, such report-generating software is text-based, and is run on mainframe systems, with a different mainframe dedicated to and accessing a database for each catalogue. Thus, for a large telecommunications company that provides services in multiple catalogues throughout the country, a separate report must be generated by each mainframe, if a company-wide result is desired. Also, conventional report-generating software can only provide a report on an on-demand type basis, in response to a user request, and does not offer the flexibility of being able to schedule reports for automatic generation.

There is a need, therefore, for a method and system that allows reports to be generated based upon the data of multiple catalogues, and in accordance with a pre-defined schedule, as well as on-demand.

SUMMARY OF INVENTION

In response to the above deficiencies of the prior art, the present invention provides a Web-based software tool for generating reports concerning the provisioning and inventorying of telecommunications services, either on-demand or in accordance with a user-defined schedule.

Thus, in a computer system having a client/server architecture, a method is provided for generating reports based on information in a telecommunications provisioning and inventorying database. The method includes a server presenting a user at a client end with a page offering parameters for formulating a report and scheduling the running and delivery of the report; the user selecting parameters upon which the report is to be formulated and scheduled; and the server interfacing with the database to retrieve information designated by the selected parameters and generating the report in accordance with the selected parameters.

In accordance with another aspect of the invention, there is provided a server for generating reports based on information in a telecommunications provisioning and inventorying database. The server is on a network utilizing a client/server architecture and is operable to: communicate with a user at a client end; present the user with a page offering parameters for formulating a report and scheduling the running and delivery of the report; receive parameters, from the user, upon which the report is to be formulated and scheduled; and interface with the database to retrieve information designated by the selected parameters and generating the report in accordance with the selected parameters.

In accordance with another aspect of the present invention, there is provided computer code running on a server for generating reports based on information in a telecommunications provisioning and inventorying database, the server being on a network utilizing a client/server architecture. The code includes: code for communicating with a user at a client end; code for presenting the user with a page offering parameters for formulating a report and scheduling the running and delivery of the report; code for receiving parameters, from the user, upon which the report is to be formulated and scheduled; and code for interfacing with the database to retrieve information designated by the selected parameters and generating the report in accordance with the selected parameters.

In accordance with another aspect of the present invention, there is provided a method of a client ordering and scheduling reports from a server for generating reports based on information in a telecommunications provisioning and inventorying database, the server being on a network utilizing a client/server architecture. The method comprises: contacting a network address of the server; in response to receipt from the server of a page offering a selection of parameters for formulating and scheduling a report, selecting the parameters; and receiving the report in accordance with the scheduling parameters.

In accordance with yet another aspect of the present invention, there is provided an apparatus for generating reports based on information in a telecommunications provisioning and inventorying database, the apparatus operating as a server on a network utilizing a client/server architecture. The apparatus comprises: means for communicating with a user at a client end; means for presenting the user with a page offering parameters for formulating a report and scheduling the running and delivery of the report; means for receiving parameters, from the user, upon which the report is to be formulated and scheduled; and means for interfacing with the database to retrieve information designated by the selected parameters and generating the report in accordance with the selected parameters.

In accordance with still another aspect of the present invention, there is provided an apparatus, operating as a client on a network having a client/server architecture, for ordering and scheduling reports from a server on the network that generates reports based on information in a telecommunications provisioning and inventorying database. The apparatus comprises: means for contacting a network address of the server; means for, in response to receipt from the server of a page offering a selection of parameters for formulating and scheduling a report, selecting the parameters; and means for receiving the report in accordance with the scheduling parameters.

DETAILED DESCRIPTION OF THE PREFERRED EMBODIMENTS

The present invention allows a user to generate reports as to provisioning and inventorying of telecommunications services.

Preferably, this functionality is implemented by software operating on a distributed system having a client/server architecture, specifically, a client under the control of the user and a server running on a host processor having access to a database.

Figure 1:
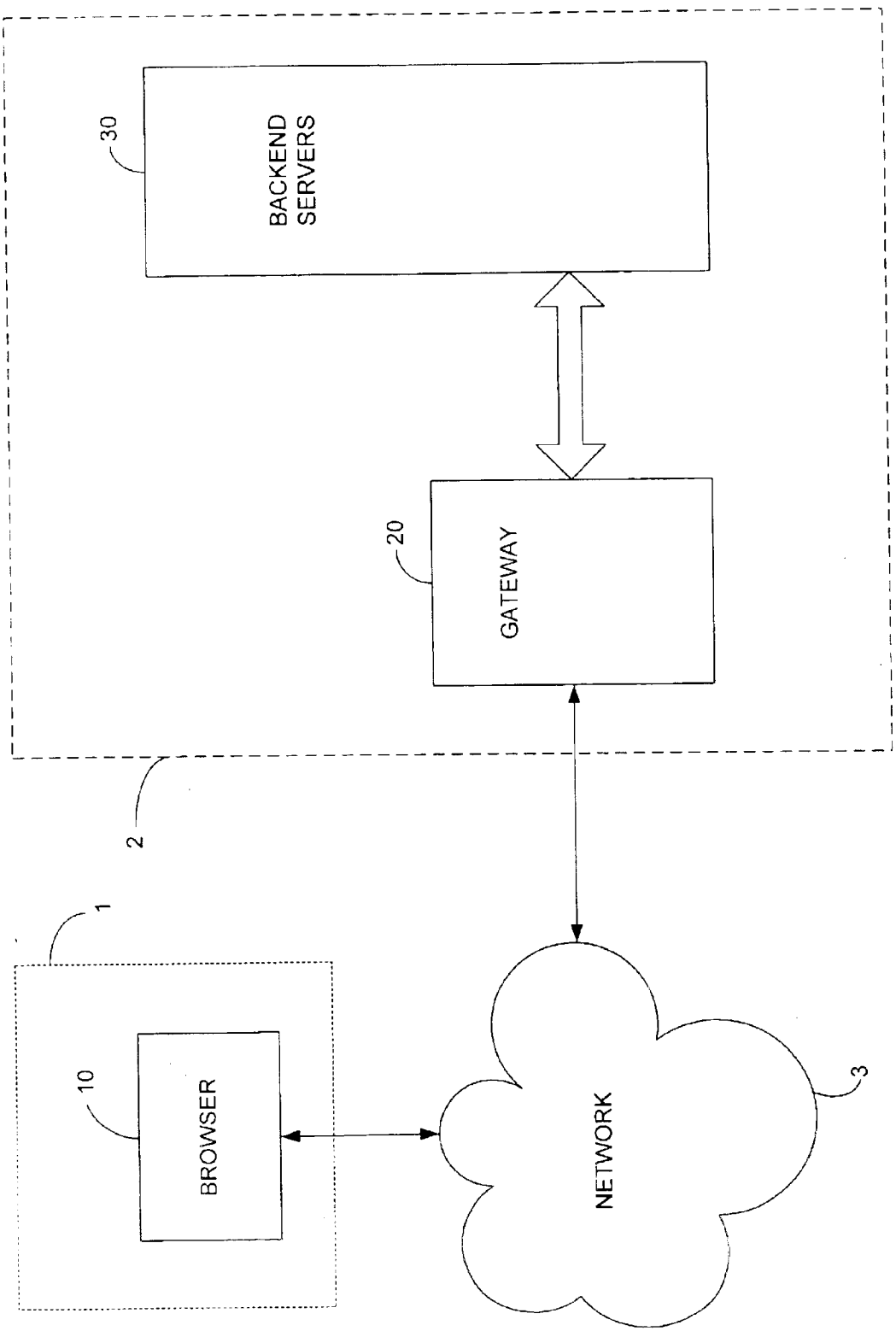
FIG. 1 is a block diagram of the report generator system of the present invention.

FIG. 1 is a block diagram illustrating the overall client/server architecture of the system of the present invention. As shown in the figure, the system, in accordance with the present invention, includes browser software 10 running on a client side 1 that can communicate over a network 3 with server side applications 2 to access global data originating from multiple catalogues throughout the country. The client side browser software 10 allows a user to interact with the server side 2, through a server gateway 20, to specify parameters for a report by specifying routing information, e.g., state; catalogue/wire center; range of telephone numbers, and the type of information being sought, e.g., all numbers having certain features; all numbers having express dial tones; status and service type of all cables. Users also can specify a time schedule for report generation, and the destination of the report, e.g., an e-mail address or file transfer protocol (FTP) destination. A group of back end servers 30, at the server side 2, perform the back end processing and data retrieval functions necessary for preparing the reports.

The reports generator of the present invention has a three-layered architecture: a) a user interface, which preferably is accessible through a network, and particularly preferably over the World Wide Web; b) a reports back end server; and c) a database engine, which gives the user access to the inventory information.

In accordance with a preferred embodiment of the present invention, the user interface of the reports generator gives the user access to various reports such as would be available in an online transaction program of a telecommunications company (telco). Such online transactions programs control assignment, activation and inventory services for the telco.

In the reports generator of the present invention, the user is given the option to view previously run-reports for any given schedule ID. In a preferred embodiment, only users belonging to the same security group can view another's schedule information and access the report. The reports generator also allows the user to view the last few schedules of the user currently accessing the reports, and gives the user the ability to schedule the report at any future time for any time zone, and to periodically schedule the report on an hourly, daily, monthly, or yearly basis. Once the ordered reports are ready, the generator also allows the user to receive the reports via e-mail or FTP, or e-mail or FTP the generated reports to others.

The user is presented with HTML pages from the server allowing the user to specify reports to be run as to various geographical areas, and at the state, district, division and wire center or switch level.

By the server interfacing with the database, reports also can retrieve information from different catalogues or different states and show all information in one document.

Preferably, an HTML page is presented to the user presenting him or her with a list or menu of reports from which to choose. Once the user selects a specific report, the user is directed to a parameters HTML page and permitted to choose the specific parameters required for the selected report. Once the parameters have been chosen, the user has the option either to run the chosen report immediately, or to schedule it for a future date and provide e-mail, or FTP information, if desired, to facilitate that delivery. Once the report starts executing, the run information is continually updated, and the user is kept informed as to the status of the report, preferably by displaying messages such as NOT_COMPLETED, NOT_STARTED, COMPLETED, or the like.

From the point of view of the server, software running on the server, in response to being contacted by the user's client browser, through the gateway, presents the user with a series of user interface (UI) screens. Preferably the UI screens are written in HTML, which can be understood by the client browser and which provides the capability to embed hyperlinks to other HTML pages on the server. Information, such as input parameters, is sent back and forth between the UI at the client and back end data servers using common gateway interface (CGI) software.

The detailed operation and structure of the system for ordering and delivering reports will now be described with reference to FIGS. 1 and 2.

Figure 2:
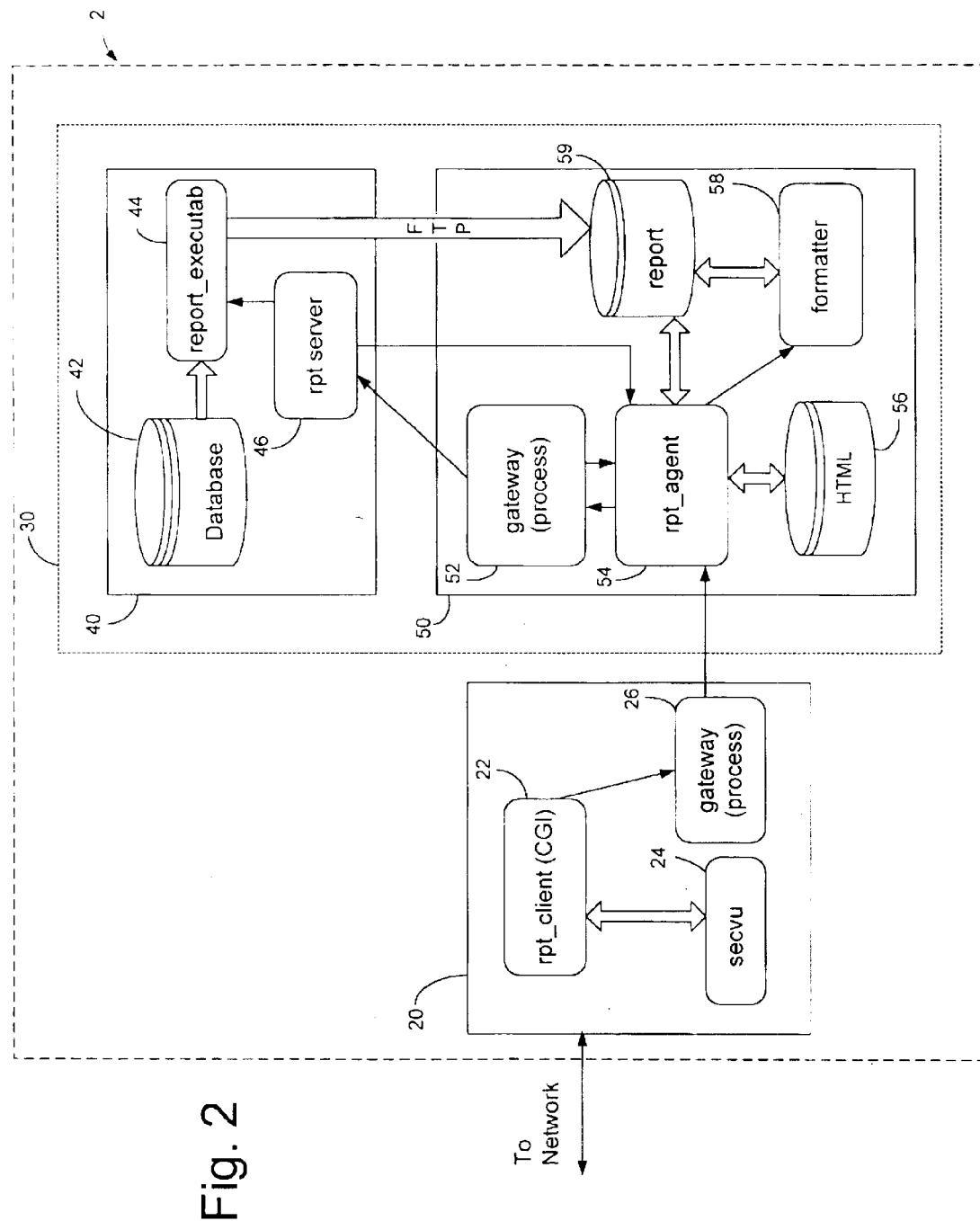
FIG. 2 is a detailed block diagram of the server-side architecture of the report generator system of the present invention.

FIG. 2 is a detailed block diagram showing the server side applications 2 of the present invention. While the figure shows only one gateway 20 and one group of back end servers 30, the system actually maintains one or more gateways 20 and back end servers 30 for each catalogue. The user can enter on his or her browser a Uniform Resource Locator (URL) for the catalogue the gateway for which he or she wishes to contact initially.

The operation of the system at the server side 2 will be described with respect to one gateway 20 and one group of back end servers 30. While each gateway is provided for a particular catalogue, the system is structured such that any gateway 20 can provide the user with one or more HTML pages giving the user the option of ordering and scheduling reports corresponding to more than one catalogue.

Requests from the user are handled as follows. First, the user enters into browser 10 the URL of the gateway he wishes initially to contact. In response, the user is presented with an HTML form allowing the user to enter a request for one or more reports.

The request from client browser 10 is routed over the network and then through the gateway 20. Process rpt_client 22, which resides on the gateway device, receives and processes the information through the CGI software. The very first time the user logs in, the user is authenticated, using process secvu 24 for security, and a session ID is created for the user. That session ID is used with any future requests. Rpt_client 22 communicates to the back end servers (rpt_agent) 54 through an interprocess communication (IPC) messaging layer, through the 0.1 gateway (process) 26.

The back end server program rpt_agent 54, in reports back end 50, receives the request for information from the client browser 10 and sends the client browser 10 either the HTML parameter page, from HTML 56, to be displayed or schedules the reports according to the schedule information that has been requested by the user.

Based on the catalogue or state information, the back end servers create different messages and route them through the local gateway process 52. The gateway 20 routes the messages to the appropriate rpt_server 46 on the database back end 40. Once the rpt_server 46 has received the message, it executes the reports, accesses information from the database 42 and the completed document is sent, by a File Transfer Protocol (FTP) exchange, from report_executab 44 to report hard drive 59, where it is made available to the program rpt_agent 54. The program rpt_agent 54 formats the report using a formatter 58 and maintains a copy of the final report on the report hard drive 59. Whenever the user requests to see the report or have the report e-mailed, the rpt_agent 54 sends the information retrieved from the report hard drive 59.

An extremely advantageous feature of the present invention is providing the user with the ability to not only order reports on demand, but also to schedule that reports be run at specified times or intervals of time. This functionality is initiated by the user choosing the schedule option on an HTML page displayed on the user's browser. The user can select periodic reports, or that a report or reports be run at a specified future time or if times.

The server, in response to the entry on the HTML page of the request for a scheduled report, stores the request in server side tables that are used to maintain the report schedule and run information for the reports being scheduled. At the server side, these internal tables are used by rpt_agent 54 alone and serve the purpose of keeping a history of all the previously run reports and scheduled reports. The rpt_agent 54 also performs routine cleanup of the previous runs which are older than a predetermined age. While the reports themselves are preferably generated using a programming language such as C++, the output preferably is filtered through Practical Extraction and Report Language (PERL), a language used for writing CGI scripts.

The report generator of the present invention provides many advantages when compared to prior systems. By virtue of the scheduling options, and the e-mail and FTP delivery options, a user can organize his or her report creation tasks much more easily than was available with on-demand-only prior art.

Further, the ability to utilize the client/server architecture, such as the World Wide Web, to interface with the data through the use of browser and server software, enables users of the system of the present invention to access information stored in multiple locations by contacting any of several gateways, as described above. Thus, the gateway for any catalogue can also provide the user the option to obtain reports for multiple other catalogues.

While the present invention has been described in terms of reports for a telecommunications system, the applicability of the present invention is not so limited. To the contrary, the techniques described above may advantageously be used to organize reports out of a database, centrally located or distributed, storing many types of information.

The above embodiments of the present invention have been described for purposes of illustrating how the invention may be made and used. However, it should be understood that the present invention is not limited to the illustrated embodiments and that other variations and modifications of the invention and its various aspects will become apparent, after having read this disclosure, to those skilled in the art, all such variations and modifications being contemplated as falling within the scope of the invention, which is defined by the appended claims.

What is claimed:

1. In a computer system having a client/server architecture, a method for generating reports based on information in telecommunications provisioning and inventorying databases, the method comprising:

one of a plurality of servers on a network presenting a user at a client end with a page offering parameters for formulating a first report containing information regarding one or more telephone numbers in a particular catalogue of telephone numbers stored in a database corresponding to the server, and scheduling the running and delivery of the first report;

the server presenting the user with a page offering parameters for formulating another report containing information regarding one or more telephone numbers in another particular catalogue of telephone numbers stored in a database corresponding to another server in the plurality of servers, and scheduling the running and delivery of the other report;

the user selecting parameters upon which the first report is to be formulated and scheduled;

the user selecting parameters upon which the other report is to be formulated and scheduled; and the server interfacing with its corresponding database to retrieve information designated by the selected parameters upon which this first report is to be formulated and scheduled and generating the first report in accordance with the selected parameters.

2. A method according to claim 1, wherein the offered parameters include a parameter indicating whether a report is to be run immediately, at a specified time, or periodically.

3. A method according to claim 1, further comprising the step of the server transmitting a completed report to a display device for display to the user.

4. A method according to claim 1, further including the step of the server storing a completed report in a memory.

5. A plurality of servers for generating reports based on information in a plurality of corresponding telecommunications provisioning and inventorying databases, each database corresponding to a server and storing a particular catalogue of telephone numbers and data regarding those telephone numbers, each server being on a network utilizing a client/server architecture and being operable to:

communicate with a user at a client end;

present the user with a page offering parameters for formulating a first report containing information regarding one or more telephone numbers in the particular catalogue of telephone numbers stored in the server's corresponding database, and scheduling the running and delivery of the first report;

present the user with a page offering parameters for formulating another report containing information regarding one or more telephone numbers in another particular catalogue of telephone numbers stored in a database corresponding to another server in the plurality of servers, and scheduling the running and delivery of the other report;

receive parameters, from the user, upon which the first report is to be formulated and scheduled;

receive parameters, from the user, upon which the other report is to be formulated and scheduled; and interface with its corresponding database to retrieve information designated by the selected parameters upon which the first report is to be formulated and scheduled and generate the first report in accordance with the selected parameters.

6. A server according to claim 5, wherein the offered parameters include a parameter indicating whether a report is to be run immediately, at a specified time, or periodically.

7. A server according to claim 5, wherein the server is further operable to transmit a completed report to a display device for display to the user.

8. A server according to claim 5, wherein the server is further operable to store a completed report in a memory.

9. Computer code running on a server for generating reports based on information in telecommunications provisioning and inventorying databases, the server being on a network utilizing a client/server architecture, the code including:

code for communicating with a user at a client end;

code for presenting the user with a page offering parameters for formulating a first report containing information regarding one or more telephone numbers in a particular catalogue of telephone numbers stored in a database corresponding to the server, and scheduling the running and delivery of the first report;

code for presenting the user with a page offering parameters for formulating another report containing information regarding one or more telephone numbers stored in a database corresponding to another server on the network, and scheduling the running and delivery of the other report;

code for receiving parameters, from the user, upon which the first report is to be formulated and scheduled;

code for receiving parameter, from the user, upon which the other report is to be formulated and scheduled; and code for interfacing with the database corresponding to the server to retrieve information designated by the selected parameters upon which the first report is to be formulated and scheduled and generating the first report in accordance with the selected parameters.

10. Computer code according to claim 9, wherein the offered parameters include a parameter indicating whether a report is to be run immediately, at a specified time, or periodically.

11. Computer code according to claim 9, further comprising code for transmitting a completed report to a display device for display to the user.

12. Computer code according to claim 9, further comprising code for storing a completed report in a memory.

13. A method of a client ordering and scheduling reports from a server for generating reports based on information in telecommunications provisioning and inventorying databases, the server being on a network utilizing a client/server architecture, the method comprising:

contacting a network address of the server;

in response to receipt from the server of a page offering a selection of parameters for formulating and scheduling a first report containing information regarding one or more telephone numbers in a particular catalogue of telephone numbers stored in a database corresponding to the server, selecting parameters;

in response to receipt from the server of a page offering a selection of parameters for formulating and scheduling another report containing information regarding one or more telephone numbers in a particular catalogue of telephone numbers stored in a database corresponding to another server on the network, selecting parameters;

receiving the first report and the other report in accordance with the scheduling parameters.

14. A method according to claim 13, wherein the offered parameters include a parameter indicating whether a report is to be run immediately, at a specified time, or periodically.

15. An apparatus for generating reports based on information in a telecommunications provisioning and inventorying database, the apparatus operating as a server on a network utilizing a client/server architecture, the apparatus comprising:

means for communicating with a user at a client end;

means for presenting the user with a page offering parameters for formulating a first report containing information regarding one or more telephone numbers in a particular catalogue of telephone numbers stored in a database corresponding to the server, and scheduling the running and delivery of the first report;

means for presenting the user with a page offering offering parameters for formulating another report containing information regarding one or more telephone numbers in a particular catalogue of telephone numbers stored in a database corresponding to another server on the network, and scheduling the running and delivery of the other report;

means for receiving parameters, from the user, upon which the first report is to be formulated and scheduled;

means for receiving parameters, from the user, upon which the other report is to be formulated and scheduled; and means for interfacing with the database to retrieve information designated by the selected parameters upon which the first report is to be formulated and scheduled and generating the first report in accordance with the selected parameters.

16. An apparatus according to claim 15, wherein the offered parameters include a parameter indicating whether a report is to be run immediately, at a specified time, or periodically.

17. An apparatus according to claim 15, further comprising means for transmitting a completed report to a display device for display to the user.

18. An apparatus according to claim 15, further comprising means for storing a completed report in a memory.

19. An apparatus, operating as a client on a network having a client/server architecture, for ordering and scheduling reports from a server on the network that generates reports based on information in a telecommunications provisioning and inventorying database, the apparatus comprising:

means for contacting a network address of the server;

means for, in response to receipt from the server of a page offering a selection of parameters for formulating and scheduling a first report containing information regarding one or more telephone numbers in a particular catalogue of telephone numbers stored in a database corresponding to the server, selecting parameters;

means for, in response to receipt from the server of a page offering a selection of parameters for formulating a scheduling another report containing information regarding one or more telephone numbers in a particular catalogue of telephone numbers stored in a database corresponding to another server on the network, selecting parameters, and;

means for receiving the first report and the other report in accordance with the scheduling parameters.

20. An apparatus according to claim 19, wherein the offered parameters include a parameter indicating whether a report is to be run immediately, at a specified time, or periodically.

* * * * *